United States Patent [19]

Colchester et al.

[11] 3,899,500

[45] Aug. 12, 1975

[54] MANUFACTURE OF BIPYRIDYLIUM SALTS

[75] Inventors: John Edward Colchester; Thomas Blundell, both of Runcorn, England

[73] Assignee: Imperial Chemical Industries Limited, London, England

[22] Filed: Jan. 21, 1974

[21] Appl. No.: 435,168

Related U.S. Application Data

[62] Division of Ser. No. 833,709, June 16, 1969, Pat. No. 3,790,585.

[30] Foreign Application Priority Data

| | | |
|---|---|---|
| July 1, 1968 | United Kingdom | 31365/68 |
| Sept. 11, 1968 | United Kingdom | 43147/68 |
| Oct. 8, 1968 | United Kingdom | 47585/68 |
| Nov. 1, 1968 | United Kingdom | 51850/68 |
| Nov. 23, 1968 | United Kingdom | 61012/68 |
| Feb. 17, 1969 | United Kingdom | 8509/69 |

[52] U.S. Cl. ............... 260/295 AM; 260/296 D
[51] Int. Cl.$^2$ .................................. C07D 213/22
[58] Field of Search ............... 260/296 D, 295 AM

[56] References Cited

UNITED STATES PATENTS 3,793,335  2/1974  Beacham et al. ............ 260/295 AM

*Primary Examiner*—Alan L. Rotman
*Attorney, Agent, or Firm*—Cushman, Darby & Cushman

[57] ABSTRACT

A process for the manufacture of a 1,1'-disubstituted-4,4'-bipyridylium salt wherein each of the substituents is alkyl or carbamidoalkyl of up to 10 carbon atoms by reacting the corresponding 1-substituted pyridinium salt with soluble cyanide in the presence of a protic solvent and base or a protic solvent which is itself a base.

33 Claims, No Drawings

MANUFACTURE OF BIPYRIDYLIUM SALTS

This is a division of application Ser. No. 833,709 filed June 16, 1969, now U.S. Pat. No. 3,790,585 dated 03 05 1974.

This invention relates to the manufacture of bipyridylium salts and particularly to a process for the manufacture of 1,1'-disubstituted-4,4'-bipyridylium salts which are useful herbicides.

According to the present invention we provide a process for the manufacture of 1,1'-disubstituted-4,4'-bipyridylium salts wherein each of the substituents contains up to 10 carbon atoms which comprises reacting an N-substituted pyridinium salt with a cyanide under basic conditions and subsequently oxidising the resulting interaction product. The cyanide is preferably an alkali metal cyanide, notably sodium cyanide.

The reaction can be carried out simply by mixing the reagents and heating the mixture if necessary, but we prefer to carry out the reaction in a solvent for the N-substituted pyridinium salt. A suitable solvent is water although a wide variety of organic solvents may be employed. Examples of organic solvents which may be used are ethers and thioethers for example tetrahydrofuran, 1,2-dimethoxyethane, bis-(2-methoxyethyl) ether, 1,4-dioxane and thiophene, ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, carbon tetrachloride and methylene dichloride; amides, particularly tertiary alkylamides, for example dimethyl formamide; sulphoxides, for example dimethyl sulphoxide; sulphones, for example sulpholane; nitriles, for example acetonitrile; alcohols, for example ethanol; nitro compounds, for example nitropropane; and alkyl carbonates and sulphates, for example propylene carbonate and dimethyl sulphate. Polar aprotic solvents, especially dimethyl sulphoxide, are particularly suitable solvents since their use leads to high yields of the bipyridylium salts. Mixtures of solvents may be used if desired.

Another particularly suitable solvent is a mixture of water and an alcohol which is miscible with water. The alcohol in such mixtures may be in particular an aliphatic monohydroxylic alcohol, especially an alkanol, although aromatic or cycloaliphatic alcohols may be used if desired. We prefer to employ alcohols of boiling point less than 100°C at atmospheric pressure, especially ethanol, and to employ distilled or de-ionised water. Mixtures of two or more alcohols with water may be used if desired.

The amounts of water and alcohol in the mixture may vary within wide limits but we have found that for any particular alcohol/water mixture there exists a range of water contents in which particularly good yields of the reaction product, and hence of the bipyridylium salt, are obtained. Although the preferred range of water contents may vary slightly for different alcohols we have found that in general mixtures are preferred which contain from 5% to 50% by volume and especially from 10% to 25% by volume of water. In general the amount of water in the mixture is preferably less than 40% by weight and especially is not more than 25% by weight, but it is to be understood that with some alcohols the preferred water content of the mixture is considerably less than 25%; for example if methanol is used as the alcohol the preferred water content of the mixture is not more than 10% by weight.

The preferred water contents mentioned above are intended only as a guide and it is to be understood that there is a particularly preferred water content for each alcohol in the mixture. Thus the preferred water content when ethanol or isopropanol is used as the solvent is from 15% to 40% by volume, especially about 20% by volume, but if methanol is used, 20% of water gives results inferior to using methanol alone. It is also to be understood that the preferred water contents mentioned above refer to reaction media which do not contain an added base such as sodium hydroxide and may be different if such a base is present.

The temperature at which the reaction is carried out is not critical although in some cases it is greatly advantageous to heat the reaction mixture. In general the reaction may be carried out at a temperature from 25°C to 120°C, preferably from 40°C to 90°C. Temperatures above 150°C should in general be avoided. Usually the reaction will be carried out under an inert atmosphere.

The reaction is carried out under basic conditions preferably, but not necessarily, in the presence of an added base. A strong base is preferred, for example an alkali metal hydroxide, although ammonium hydroxide or an organic amine may be used. In protic solvents, for example aqueous media, the addition of a base is desirable in that higher yields of the desired product and faster rates of reaction are thereby achieved. In polar aprotic solvents, for example anhydrous dimethyl sulphoxide the addition of a separate base may not be essential since the cyanide may itself be sufficiently basic under the reaction conditions. A separate base may, however, be added in such cases if desired. It is believed that the product of the reaction in the presence of an added base is a 1,1'-disubstituted-1,1'-dihydro-4,4'-bipyridyl.

The amount of the cyanide is not critical although we prefer to employ an excess of this reagent. Preferably at least 0.25 moles of the cyanide are used per mole of the pyridinium salt; 1 to 4 moles in the presence of an added base and in excess of 4 moles in the absence of an added base. The concentration of the pyridinium salt in cases where it is employed in the form of a solution will depend upon the solvent used, and the optimum concentration in each case can be determined by simple experiment. In general, however, concentrations of from 0.1 to 2.0 moles per litre and especially about 0.5 mole per litre are suitable. By way of example the optimum concentration of methyl pyridinium ion in a water/ethanol (20% v/v water) mixture is about 0.5 mole per litre.

Any N-substituted pyridinium salt may be converted to a bipyridylium salt by the process of our invention which has an N-substituent containing up to 10 carbon atoms, and particularly suitable salts are those having an alkyl or a carbamidoalkyl substituent, and especially a methyl or a carbamidomethyl substituent, on the nitrogen atom of the pyridine nucleus. The carbamidoalkyl substituent has the formula —$R_1$—CO—$NR_2R_3$ wherein $R_1$ is a hydrocarbon radical (especially the methylene radical) and $R_2$ and $R_3$ are hydrocarbon or substituted hydrocarbon radicals and $R_2$ and $R_3$ may, together with the attached nitrogen atom make up a heterocyclic ring. The salt is conveniently a halide and especially a chloride salt, though the anionic species is not critical and other salts may be used, if desired. The pyridine nucleus may be substituted, for example by one or more alkyl groups in the 2,3,5 and 6 positions, but the 4-position preferably should be unoccupied. In the case of an N-alkyl pyridinium salt the alkyl group preferably contains from 1 to 4 carbon atoms.

The interaction product derived from the pyridinium salt and the cyanide is readily oxidised to the corresponding 1,1'-disubstituted-4,4'-bipyridylium salt by treatment with air or with an oxidizing agent which is an electron acceptor and has a redox potential in water more positive than —0.50 volts as compared with the saturated calomel electrode. Examples of suitable oxidising agents are ceric sulphate (in dilute sulphuric acid); metal salts, especially the halides; inorganic oxyacid anhydrides, especially sulphur dioxide; chlorine; air, preferably in conjunction with water and/or carbon dioxide and/or an acid for example acetic acid or sulphuric acid; and organic oxidising agents for example quinones such as benzoquinone; chloranil and anthraquinone. The oxidation is advantageously carried out under acidic conditions, the apparent pH of the reaction mixture being preferably less than 7, especially from 4 to 6. Addition of the oxidising agent in an acidic medium is usually sufficient to achieve this result.

Depending upon the conditions under which it is prepared the interaction product of the pyridinium salt and the cyanide may be in the form of a solution or a slurry. Thus, for example if the reaction is carried out in a protic solvent, notably an aqueous medium, the intermediate reaction product is in the form of a slurry of a brown solid precipitate in a solution which is usually blue in colour. It is believed that the interaction product is not a single species and is present in the liquid phase in addition to the solid phase. If, in the other hand, the reaction is carried out in a polar aprotic solvent, notably dimethyl sulphoxide, the intermediate reaction product is in the form of a solution, usually coloured brown.

The intermediate reaction product can be oxidised directly without isolation from the mixture in which it has been prepared. However, if this product is oxidised directly the final bipyridylium salt is impure and requires to be purified. In particular the bipyridylium salt so obtained contains free cyanide ions and these anions may react with the bipyridylium cation so reducing the yield of the salt. Methods for separating the bipyridylium cation from free cyanide ions are described hereinafter.

It is usually more convenient to isolate the intermediate reaction product prior to oxidising it so that oxidation yields a fairly pure bipyridylium salt substantially free from cyanide ions. In the case where the intermediate product is a slurry the solid can be isolated by filtration or preferably by solvent extraction. Suitable solvents for the extraction are hydrocarbons, particularly aromatic hydrocarbons and notably toluene. The temperature can be from 0°C to 100°C. After removal of the solid there remains a portion of the intermediate reaction product in the liquid phase; this can be recovered either by oxidising it to the bipyridylium salt and isolating this salt as hereinafter described or by reducing it to form a further amount of a solid (believed to be a dihydrobipyridyl) which can be isolated as described above prior to oxidising it. The reduction can be effected by any conventional reduction technique, for example using an alkali metal amalgam or a dithionite.

In the case where the intermediate reaction product is a solution, as for example when it is prepared in a polar aprotic solvent, we have found that a useful technique for isolating it is to add to the reaction mixture water, an organic acid, notably acetic acid, or a base (anhydrous or an aqueous solution of the base). This addition results in a slurry similar to that obtained if the initial reaction is carried out in a protic solvent. The temperature of this treatment can be from 0°C to 100°C, preferably from 20°C to 50°C. The solid and liquid phases of the slurry can be treated as described above to recover the intermediate reaction product. In addition to enabling substantially pure bipyridylium salts to be obtained this technique has the advantage that higher yields are obtainable than when the solution containing the intermediate product is oxidised directly. Moreover, the product obtained as a result of the treatment is easily oxidised with a greater variety of oxidising agents than is the solution prior to the treatment. It is believed that the solid obtained as a result of adding water or a base to the solution of the intermediate reaction product is a 1,1'-disubstituted-1,1'-dihydro-4,4'-bipyridyl.

As hereinbefore explained it may be necessary to separate the final bipyridylium salt from free cyanide ions in the reaction mixture, for example if the intermediate reaction product is oxidised without first isolating it from the intermediate reaction mixture. We have found that 1,1'-disubstituted-4,4'-bipyridylium cations can be separated from cyanide ions in the reaction mixture by treating the mixture with 4,4'-diamino-stilbene-2,2'-disulphonic acid which is commonly known as "amsonic acid". The bipyridylium cation is thereby precipitated from the mixture in the form of its amsonate salt whilst the cyanide ions remain in the mixture. The precipitate can then be removed by filtration, washed and dried in conventional manner and the amsonic acid can be regenerated and recovered for re-use by acidification of the amsonate salt, preferably employing an aqueous solution of an acid. The acid used to recover the amsonic acid can be selected so as to provide the desired anion for the resulting bipyridylium salt and can be for example hydrochloric acid, phosphoric acid or acetic acid.

Amsonic acid is only sparingly soluble in water and it is therefore usually employed in the present invention in the form of an aqueous solution of one of its water-soluble salts, conveniently an alkali metal salt or the ammonium salt. The treatment of the reaction mixture with amsonic acid can be conveniently at a pH in the range 7 to 12, and at a temperature of from 0°C to 100°C.

The 1,1'-disubstituted-4,4'-bipyridylium cation can also be separated from cyanide ions in the reaction mixture by contacting this mixture with a suitable cation-exchange resin. In this way the cyanide ions pass the resin and remain in the mixture so that they are separated from the bipyridylium cation. The bipyridylium cation can subsequently be liberated from the ion-exchange resin by treatment of the resin with an acid. In this way a bipyridylium salt is obtained wherein the anion is that supplied by the acid. Examples of the anions which may be introduced into the mixture in this way are chloride, sulphate and acetate ions.

Alternatively, the cyanide ions can be removed from the bipyridylium cations using an anion-exchange resin.

The temperature at which the mixture is contacted with the ion-exchange resin is not critical but can conveniently be from 0°C to 100°C. Examples of suitable cation-exchange resins are the Zeocarb cation exchange resins, for example Zeocarb 225 (SRC-8), the Amberlite cation exchange resins for example Amberlite Resin C6-120, and the Deacidite resins. An example of an anion exchange resin which can be used is Amberlite IRA 400.

A further method of removing cyanide ions from the reaction mixture containing the 1,1'-disubstituted-4,4'-bipyridylium salt is to acidify and then de-gas the reaction mixture. In this way the cyanide ions are removed from the mixture in the form of hydrogen cyanide and the process is particularly convenient since the hydrogen cyanide so liberated can be reacted directly with a base, for example sodium hydroxide, to form a cyanide which can be used to prepare a further quantity of the bipyridylium cation. Any mineral or organic acid can be used which results in the formation of hydrogen cyanide and examples of suitable acids are hydrochloric, sulphuric, phosphoric and acetic acids. Alternatively the solution can be acidified by means of sulphur dioxide. The acid used can be selected to provide the required anionic species in the final 1,1'-disubstituted-4,4'-bipyridylium salt.

Acidification of the reaction mixture can be effected at any temperature at which the bipyridylium cation is stable, for example from 0°C to 100°C. The mixture can be de-gassed in conventional manner, for instance by bubbling air or an inert gas through it under vacuum or by boiling the mixture. It will be appreciated that this technique of acidification followed by de-gassing of the mixture is simple to carry out and can be employed to remove from the mixture any anion which forms with a proton a volatile product which can be removed from the mixture by de-gassing. In addition to cyanide ions, halide ions, especially fluoride and chloride ions can be removed by the technique.

Cyanide anions can also be in effect removed from mixtures containing 1,1'-disubstituted-4,4'-bipyridylium cations by addition to the mixtures at a temperature of from 0°C to 100°C of a reagent which forms a complex salt with the cyanide ions. For example the addition of ferric or ferrous ions in the form of a salt for example a sulphate or halide salt results in the formation of a ferrocyanide. In this case the cyanide ions are not actually removed from the reaction mixture but they are effectively prevented from reacting with the bipyridylium salt by virtue of their being in the form of a complex salt with the added cations.

The invention is illustrated but in no way limited by the following examples.

EXAMPLE 1

18 ml of an aqueous solution containing methyl pyridinium chloride (64 g - 0.05 moles) was added rapidly to a solution of sodium cyanide (9.8 g - 0.2 mole) in water (20 ml) under an atmosphere of nitrogen. The mixture was heated under reflux for 30 minutes and a deep violet coloured mixture was obtained. The electron spin resonance (E.S.R.) of the mixture indicated the presence of 1,1'-dimethyl-4,4'-bipyridylium radical cation.

The deep violet coloured mixture was treated with excess ceric sulphate in dilute sulphuric acid as oxidising agent to yield 1,1'-dimethyl-4,4'-bipyridylium ion, representing an overall reaction efficiency of 17% with respect to methyl pyridinium chloride fed.

EXAMPLE 2

Methyl pyridinium chloride (2.9 g - 0.02 mole) was dissolved in 30 ml dry dimethyl sulphoxide and the solution was added rapidly to a stirred solution of sodium cyanide (4.9 g - 0.1 mole) in dry dimethyl sulphoxide (20 ml) at 75°C under an atmosphere of nitrogen. The mixture was heated under reflux for 30 minutes and a deep brown colour developed.

The deep brown mixture was treated with excess ceric sulphate in dilute sulphuric acid as oxidising agent to yield 1,1'-dimethyl-4,4'-bipyridylium ion, representing an overall reaction efficiency of 73% with respect to methyl pyridinium chloride fed.

EXAMPLE 3

The procedure of Example 2 was repeated except that the solution of sodium cyanide was in 30 ml of dimethyl sulphoxide and contained sodium bicarbonate (10 g) and the temperature was 70°C. The reaction efficiency was 88%.

EXAMPLE 4

A mixture of methyl pyridinium chloride (3.1 gms), sodium cyanide (4.9 g) and sodium bicarbonate (10 gms) in dimethyl sulphoxide (80 mls) was heated for 20 minutes at 70°C with stirring under an atmosphere of nitrogen. The resulting brown mixture was treated with a solution of ceric sulphate in dilute sulphuric acid to yield 1,1'-dimethyl-4,4'-bipyridylium ion. The overall reaction efficiency was 89% with respect to methyl pyridinium chloride fed.

The above procedure was repeated except that the sodium bicarbonate was omitted from the reaction mixture. The overall reaction efficiency was 85% with respect to methyl pyridinium chloride fed.

EXAMPLE 5

Methyl pyridinium chloride (3.1 gms) in dimethyl sulphoxide (50 mls) was added with stirring to a suspension of sodium cyanide (4.9 gms) in dimethyl sulphoxide (30 mls) at 70°C under an atmosphere of nitrogen. After 30 minutes a cooled solution of sulphur dioxide in dimethyl sulphoxide was added to the brown reaction mixture. The mixture immediately turned blue and upon standing for 1½ hours became brown.

Excess sulphur dioxide was then removed from the mixture by bubbling nitrogen gas through it. The mixture was found by analysis to contain 1,1'-dimethyl-4,4'-bipyridylium ion. The reaction efficiency was 95% based on methyl pyridinium chloride fed.

EXAMPLES 6 to 9

A suspension of methyl pyridinium chloride (3.1 gms) in dimethyl acetamide (50 mls) was added to a stirred suspension of sodium cyanide (4.9 gms) in dimethyl acetamide (50 mls) at 75°C under an atmosphere of nitrogen. A yellow colouration developed at once and after 1 hour the colour had become dark orange. This mixture was poured into a solution of ceric sulphate in dilute acetic acid to yield 1,1'-dimethyl-4,4'-bipyridylium ion. The reaction efficiency was 66% with respect to methyl pyridinium chloride fed.

The above procedure was repeated three times (Examples 7, 8 and 9) but using the solvents shown below instead of dimethyl acetamide. The reaction efficiencies were:

| Example No. | Solvent | Efficiency (%) |
|---|---|---|
| 6 | dimethyl acetamide | 66 |
| 7 | dimethyl formamide | 36 |
| 8 | acetone | 23 |
| 9 | hexamethylene phosphortriamide | 45 |

EXAMPLE 10

A mixture containing 1,1'-dimethyl-4,4'-bipyridylium cations, methyl pyridinium ions and cyanide ions and other impurities, obtained by reacting methyl pyridinium chloride with sodium cyanide in dimethyl sulphoxide, was neutralised (pH 7) by addition of dilute sulphuric acid.

A neutral aqueous solution of the disodium salt of amsonic acid was added to the above neutralised mixture with stirring. The resulting mixture became dark in colour and a black precipitate of 1,1'-dimethyl-4,4'-bipyridylium amsonate was formed. The precipitate was filtered off and washed with water and then dried in air. Analysis indicated that the black solid so obtained had a purity of greater than 98%, and cyanide ions could not be detected in it.

The black solid was then treated with a dilute aqueous solution of sulphuric acid, yielding a yellow solid and a clear solution. The solid, identified as amsonic acid, was filtered off and the remaining solution was analysed. The solution contained 1,1'-dimethyl-4,4'-bipyridylium cations in an amount representing a near quantitative recovery of this cation from the initial mixture. The solution was free from cyanide ions and methyl pyridinium ions.

EXAMPLE 11

A mixture containing 1,1'-dimethyl-4,4'-bipyridylium cations and cyanide ions as in Example 10 was neutralised by adding dilute hydrochloric acid solution. A steady stream of nitrogen gas was bubbled through the mixture which was heated to about 100°C for 30 minutes during which time hydrogen cyanide was detected in the stream of nitrogen leaving the reaction vessel. The mixture was allowed to cool and analysis of the cooled mixture indicated that the amount of 1,1'-dimethyl-4,4'-bipyridylium cation was the same as in the original impure mixture. Cyanide ions could not be detected in the final mixture.

EXAMPLE 12

A mixture containing 1,1'-dimethyl-4,4'-bipyridylium cations and cyanide ions as described in Example 10 was neutralised by adding dilute aqueous hydrochloric acid solution. The mixture was then added to an aqueous solution of sodium hypochlorite at a pH below 9. Analysis of the resulting mixture failed to detect the presence of cyanide ions and showed that the amount of 1,1'-dimethyl-4,4'-bipyridylium cations was the same as in the original mixture.

EXAMPLE 13

A mixture containing 1,1'-dimethyl-4,4'-bipyridylium cations and cyanide ions as described in Example 10 was neutralised by adding a dilute aqueous solution of hydrochloric acid. The mixture was then mixed with an aqueous solution of ferrous sulphate heptahydrate containing a slight molar excess of the heptahydrate with respect to cyanide ions in the mixture being treated. Free cyanide ions could not be detected in the mixture from which a small quantity of ferrocyanide was removed by filtration.

EXAMPLE 14

A mixture containing 1,1'-dimethyl-4,4'-bipyridylium cations and cyanide ions as described in Example 10 was passed down an anion exchange column comprising Deacidite FF resin. The solution recovered from the base of the column contained no detectable amounts of cyanide ions. The amount of 1,1'-dimethyl-4,4'-bipyridylium cation in the mixture was unchanged.

EXAMPLE 15

A mixture containing 1,1'-dimethyl-4,4'-bipyridylium cations and cyanide ions as described in Example 10 was passed down an ion exchange column comprising Zeocarb 225 (SRC-8) Resin. The solution recovered from the base of the column contained cyanide ions but was free from 1,1'-dimethyl-4,4'-bipyridylium cations.

After removal of the cyanide ion-containing solution, N/10 aqueous hydrochloric acid was passed down the column and the solution recovered from the base of the column was found by analysis to contain 1,1'-dimethyl-4,4'-bipyridylium cations in an amount representing a quantitative recovery of these ions from the initial mixture.

EXAMPLE 16

A de-oxygenated solution of methyl pyridinium chloride (3.2 gms, 0.025 mole) in aqueous ethanol (50 ml) containing 20% by volume of water was mixed with sodium cyanide (4.9 g; 0.1 mole) under an atmosphere of nitrogen. The mixture was heated under reflux for 5 hours.

The resulting deep-blue reaction mixture was treated with excess ceric sulphate in dilute sulphuric acid as oxidising agent to yield 1,1'-dimethyl-4,4'-bipyridylium ions, in an amount representing an overall reaction efficiency of 65% with respect to methyl pyridinium chloride fed.

EXAMPLE 17

An acidic reaction mixture containing 1,1'-dimethyl-4,4'-bipyridylium ion, obtained as in Example 16, was concentrated to one-quarter of its original volume by distillation under atmospheric pressure. The aqueous solution of bipyridylium salt was shown by analysis to be free of alcohol and cyanide ions, and the bipyridylium ion content was the same as in the original mixture.

EXAMPLE 18

The initial procedure of Example 16 was repeated to produce the deep-blue reaction mixture. This mixture was cooled in an ice/water bath and then liquid sulphur dioxide (15 ml) was added to it. The resulting suspension was mixed with water to yield an aqueous solution containing 1,1'-dimethyl-4,4'-bipyridylium ion, in an amount corresponding to a reaction efficiency of 65% with respect to methyl pyridinium chloride fed.

EXAMPLE 19

The procedure of Example 16 was repeated using ethanol containing various proportions of water. The effect of the water content of the ethanol on the reaction is shown in Table 1.

Table 1

| Water content (% v/v) | Reaction efficiency (%) |
|---|---|
| 0 | 54 |
| 10 | 61 |
| 20 | 65 |
| 40 | 38 |
| 60 | 13 |

EXAMPLE 20

The procedure of Example 16 was repeated but using various molar proportions of sodium cyanide relative to methyl pyridinium ion. The results are shown in Table 2.

Table 2

| Moles NaCN/mole MPC | Efficiency (%) |
|---|---|
| 12 | 63 |
| 4 | 65 |
| 2 | 58 |
| 1 | 45 |

MPC represents methyl pyridinium chloride.

EXAMPLE 21

The procedure of Example 16 was repeated but using various volumes of the aqueous ethanol mixture. The results are summarised in Table 3.

Table 3

| MPC (moles/litre) | Efficiency (%) |
|---|---|
| 0.31 | 58 |
| 0.50 | 65 |
| 1.00 | 62 |

EXAMPLE 22

The procedure of Example 16 was repeated using a variety of reaction periods. The results are summarised in Table 4.

Table 4

| Reaction period (hrs) | Efficiency (%) |
|---|---|
| 1 | 27 |
| 2¼ | 44 |
| 5 | 65 |
| 9 | 54 |

EXAMPLE 23

The procedure of Example 16 was repeated using anhydrous and also aqueous mixture of n-propanol, iso-propanol, iso-butanol and tert-butanol instead of ethanol. The results are shown in Table 5.

Table 5

| Alcohol | Water content (% v/v) | Efficiency (%) |
|---|---|---|
| n-propanol | 0 | 30 |
| ″ | 20 | 52 |
| iso-propanol | 0 | 17 |
| ″ | 20 | 54 |
| iso-butanol | 0 | 20 |
| ″ | 20 | 37 |
| tert-butanol | 0 | 9 |
| ″ | 20 | 33 |

EXAMPLE 24

A solution of methyl pyridinium chloride (2.80 g) in water (10 ml) was added rapidly to a stirred mixture of sodium cyanide (4.9 g) and sodium hydroxide (3.0 g) in water (10 ml). The mixture was layered with benzene (60 ml) at room temperature under an atmosphere of nitrogen. The mixture was heated to 80°C and the benzene layer (50 ml) which was shown by U.V. spectroscopy to contain 1,1'-dimethyl-dihydro-4,4'-bipyridyl was collected after one half hour and oxidised by addition of an aqueous solution of sulphur dioxide gas. The benzene withdrawn from the mixture was replaced by fresh benzene and further withdrawals and additions were made after periods of 15, 30 and 60 minutes. These were oxidised in the manner described above. The combined aqueous layers were found to contain 1,1'-dimethyl-4,4'-bipyridylium ion, in an amount representing an overall reaction efficiency of 53% based on methyl pyridinium chloride fed.

EXAMPLE 25

A solution of methyl pyridinium chloride (3.10 g) in water (10 ml) was added rapidly to a stirred mixture of sodium cyanide (2.5 g) and sodium hydroxide (1 g) in ethanol (40 ml) at room temperature under an atmosphere of nitrogen. The mixture was heated under reflux for one half hour and then cooled. Liquid sulphur dioxide (10 ml) was added to the violet coloured mixture and produced an orange coloured solution which was found to contain 1,1'-dimethyl-4,4'-bipyridylium ion in an amount representing an overall efficiency of 94% based on methyl pyridinium chloride fed.

EXAMPLE 26

A solution of methyl pyridinium chloride (3.10 g) in water (10 ml) was added rapidly to a stirred solution of sodium cyanide (4.9 g) and sodium hydroxide (3.0 g) in water (20 ml) at room temperature under an atmosphere of nitrogen. The mixture was heated under reflux for two hours and then cooled. Liquid sulphur dioxide (10 ml) was added to the violet coloured mixture and produced an orange coloured solution which was found to contain 1,1'-dimethyl-4,4'-bipyridylium ion in an amount representing an overall reaction efficiency of 84% based on methyl pyridinium chloride fed.

EXAMPLE 27

Methyl pyridinium chloride (3.0 g) and sodium cyanide (4.9 g) were reacted together in dimethyl sulphoxide (80 ml) at 80°C for 30 minutes. The mixture was then cooled to room temperature and poured into a solution of the oxidising agent (see Table 6) in dimethyl formamide (80 ml). After 30 minutes 2N aqueous sulphuric acid was added to adjust the pH to 1 and the solution was then analysed for the bipyridylium cation. In some cases (see Table 6) either water (80 ml), solid sodium hydroxide pellets, or acetic acid (10 ml) were added to the reaction mixtures 5 minutes before oxidation was effected.

Table 6

| Oxidising Agent | Equivalents of oxidising agent | Additional reagent | Reaction efficiency * |
|---|---|---|---|
| Maleic anhydride | 2 | None | 23 |
| " | 2 | water | 69 |
| " | 2 | sodium hydroxide | 61 |
| " | 2 | acetic acid | 55 |
| " | 6 | none | 65 |
| Chloranil | 2 | none | 0 |
| " | 2 | water | 50 |
| " | 4 | none | 53 |
| Alloxan monohydrate | 2 | none | 3 |
| " | 2 | water | 78 |
| " | 4.5 | none | 63 |
| Indane Trione monohydrate | 2 | none | 65 |
| m-dinitrobenzene | 2 | none | 5 |
| " | 2 | water | 0 |
| " | 2 | sodium hydroxide followed by acetic acid | 59 |
| " | 2 | acetic acid | 14 |

*based on methyl pyridinium chloride fed.

EXAMPLE 28

Methyl pyridinium chloride (3.0 g) and sodium cyanide (4.9 g) were reacted together in dimethyl sulphoxide (80 ml) at 80°C for 30 minutes. The mixture was then cooled and toluene (200 ml) was added, followed by water (50 ml). The mixture was separated and the toluene layer was oxidised in a two phase system comprising m-dinitrobenzene (10 g) in toluene (100 ml) and acetic acid (10 ml) in water (100 ml) to yield an aqueous phase containing 7.7% of the bipyridylium cation free from cyanide ions and an organic phase containing unchanged m-dinitrobenzene.

EXAMPLE 29

Methyl pyridinium chloride (3.1 gm) in water (10 ml) was added to a mixture of sodium hydroxide (1.0 g) and sodium cyanide (2.5 g) in ethanol (40 ml) at room temperature under an atmosphere of nitrogen. The mixture was stirred at room temperature for 30 minutes, heated under reflux for 30 minutes and then cooled. Chlorine gas was bubbled through the resulting solution until all trace of blue colouration had disappeared. An aliquot of this mixture was then reduced in a buffer solution at pH 9.2 by sodium dithionate.

The solution was analysed and the reaction efficiency as determined by spectrophotometry was 95% in respect of bipyridylium cation based on pyridinium salt fed.

EXAMPLE 30

Methyl pyridinium chloride (3.1 gm) in water (10 ml) was added to a mixture of sodium hydroxide (3.0 g) and sodium cyanide (4.9 g) in water (20 ml) at room temperature under an atmosphere of nitrogen. The mixture was stirred at room temperature for 30 minutes, heated under reflux for two hours and then cooled. Chlorine gas was bubbled through the solution until all trace of blue colouration had disappeared. An aliquot of this mixture was then reduced in a buffer solution at pH 9.2 by sodium dithionate, and the efficiency was found to be 73% by spectrophotometry.

EXAMPLE 31

Methyl pyridinium chloride (6.2 g) in water (20 ml) was added to a mixture of sodium hydroxide (6.0 g) and sodium cyanide (9.8 g) in water (40 ml) at room temperature under an atmosphere of nitrogen. The mixture was stirred at room temperature for 30 minutes, heated under reflux for two hours and then cooled. Toluene (500 ml) was added and the mixture partitioned. The toluene layer was oxidised by sulphur dioxide to yield the bipyridylium cation (efficiency 65%). The aqueous layer was treated with 2N sodium hydroxide (25 ml) and sodium dithionite (2 g) and repartitioned with toluene (15 ml). This toluene layer was oxidised by sulphur dioxide to yield the bipyridylium cation (efficiency 10%). The residual aqueous layer was found to contain only 2% of the bipyridylium salt after oxidation. The total overall reaction efficiency was 77%.

EXAMPLE 32

Methyl pyridinium chloride (3.0 g) in water (10 ml) was added to a solution of sodium hydroxide (3.0 g) and sodium cyanide (4.9 g) in water (30 ml) at room temperature under an atmosphere of nitrogen. The mixture was stirred at room temperature for 30 minutes, heated to reflux temperature over a period of 30 minutes and then heated under reflux for two hours. The reaction mixture was then cooled and treated by one of two procedures A or B.

A. The reaction mixture was diluted to 500 ml with deoxygenated water and the resulting aqueous suspension was filtered. Portions of the solid so produced were oxidised to yield the bipyridylium salt by a number of reagents (see Table 7). In each case 0.263 g of solid was reacted with a solution of the oxidising agent (1 g) under nitrogen. After 5 minutes acetic acid (1 ml) was added and the mixture was diluted with water to 100 ml. The filtrate was oxidised with sulphur dioxide and yielded a further quantity of the bipyridylium salt.

Table 7

| Oxidising Agent | Solvent | Efficiency |
|---|---|---|
| m-dinitrobenzene | dimethyl formamide | 99 |
| Maleic anhydride/HOAc | dimethyl formamide | 87 |
| Potassium ferricyanide | water | 96 |
| Ceric sulphate | 1N $H_2SO_4$ | 85 |

B. The reaction mixture was extracted by toluene (250 ml). The aqueous layer was removed and oxidised by sulphur dioxide to yield the bipyridylium cation (15%). Portions of the organic phase were oxidised using sulphur dioxide or m-dinitrobenzene. In the latter case oxidation was carried out in a two-phase system comprising m-dinitrobenzene (10 g) in toluene (100 ml) and acetic acid (10 ml) in water (100 ml) to yield an aqueous phase containing 69% of the bipyridylium salt and an organic phase containing unchanged m-dinitrobenzene. In each case A or B free cyanide ions could not be detected in the final solutions.

EXAMPLE 33

A reaction mixture comprising methyl pyridinium chloride (3.0 g), sodium hydroxide (1 g) and sodium cyanide (2.5 g) in 80% aqueous ethanol (50 ml) treated in the same manner as in Example 32 but heated under reflux for 30 minutes only, yielded by method A 74% and 20% of the bipyridylium salt from the solid and filtrate respectively, and by method B where water (50 ml) was also added before separation, 45% and 42% from the aqueous and toluene phases respectively.

EXAMPLE 34

A reaction mixture comprising methyl pyridinium chloride (3.0 g) and sodium cyanide (4.9 g) in dimethyl sulphoxide (80 ml) maintained at 80°C for 30 minutes, yielded by method A of Example 32, 30% and 62% of the bipyridylium salt from the solid and filtrate respectively, and by method B, where water (80 ml) was added before separation, 15% and 77% from the aqueous and toluene phases respectively.

What we claim is:

1. A process for the manufacture of a dihydrobipyridyl which is oxidizable to a 1,1'-disubstituted-4,4'-bipyridylium salt wherein each 1-substituent is an alkyl or carbamidoalkyl of up to 10 carbon atoms consisting essentially of reacting the corresponding 1-substituted pyridinium salt with soluble cyanide in the presence of a protic solvent and an added alkali metal base or ammonium base.

2. A process as claimed in claim 1 wherein the cyanide is an alkali metal cyanide.

3. A process as claimed in claim 2 wherein the cyanide is sodium cyanide.

4. A process as claimed in claim 1 wherein the solvent is an aqueous medium.

5. A process as claimed in claim 4 wherein the solvent is water.

6. A process as claimed in claim 4 wherein the solvent is a mixture of water and an alkanol.

7. A process as claimed in claim 6 wherein the alkanol has a boiling point not greater than 100°C.

8. A process as claimed in claim 7 wherein the alkanol is ethanol.

9. A process as claimed in claim 6 wherein the solvent contains up to 5 to 50% by volume of water.

10. A process as claimed in claim 9 wherein the solvent contains less than 40% by volume of water.

11. A process as claimed in claim 1 wherein the reaction is carried out at a temperature of less than 150°C.

12. A process as claimed in claim 11 wherein the temperature is from 25°C to 120°C.

13. A process as claimed in claim 1 wherein the added base is an alkali metal hydroxide.

14. A process as claimed in claim 13 wherein the alkali metal base is sodium hydroxide.

15. A process as claimed in claim 1 wherein there is employed at least 2 moles of the cyanide per mole of the pyridinium salt.

16. A process as claimed in claim 1 wherein the concentration of the pyridinium salt is from 0.1 to 2 moles per litre.

17. A process as claimed in claim 8 wherein the interaction product is subsequently oxidized under acidic conditions.

18. A process as claimed in claim 17 wherein the oxidation is carried out at a pH of from 4 to 6.

19. A process as claimed in claim 1 wherein the product is subsequently oxidised.

20. A process as claimed in claim 19 wherein the interaction product is oxidised by means of an oxidising agent which is an electron acceptor and which has a redox potential in water more positive than −0.50 volt as compared with the saturated calomel electrode.

21. A process as claimed in claim 20 wherein the oxidising agent is ceric sulphate.

22. A process as claimed in claim 20 wherein the oxidizing agent is sulphur dioxide.

23. A process as claimed in claim 20 wherein the oxidising agent is chlorine.

24. A process as claimed in claim 20 wherein a quinone is employed as the oxidizing agent.

25. A process as claimed in claim 1 wherein the N-substituted pyridinium salt is an N-alkyl pyridinium salt wherein the alkyl group contains up to 10 carbon atoms.

26. A process as claimed in claim 25 wherein the alkyl group contains from 1 to 4 carbon atoms.

27. A process as claimed in claim 26 wherein the N-substituted pyridinium salt is an N-methyl pyridinium salt.

28. A process as claimed in claim 1 wherein the N-substituted pyridinium salt is an N-carbamidoalkyl pyridinium salt wherein the carbamidoalkyl group contains up to 10 carbon atoms.

29. A process as claimed in claim 28 wherein the N-substituted pyridinium salt is an N-carbamidomethyl pyridinium salt.

30. A process as claimed in claim 25 wherein the N-substituted pyridinium salt is an N-substituted pyridinium chloride.

31. A process as claimed in claim 1 wherein at least a part of the reaction product is subsequently oxidized under acidic conditions and wherein the reaction product is oxidized by means of an oxidizing agent which is an electron acceptor and which has a redox potential in water more positive than −0.50 volt as compared with the saturated calomel electrode.

32. A process for the manufacture of a dihydrobipyridyl which is oxidizable to a 1,1'-disubstituted-4,4'-bipyridylium salt wherein each 1-substituent is an alkyl or carbamidoalkyl of up to 10 carbon atoms consisting essentially of reacting the corresponding 1-substituted pyridinium salt with soluble cyanide in the presence of a protic solvent which is itself a base.

33. A process as claimed in claim 32 wherein the protic solvent also contains an added alkali metal base or ammonium base.

\* \* \* \* \*

UNITED STATES PATENT OFFICE
CERTIFICATE OF CORRECTION

Patent No. 3,899,500　　　　　　　Dated August 12, 1975

Inventor(s) John Edward Colchester et al.

It is certified that error appears in the above-identified patent and that said Letters Patent are hereby corrected as shown below:

The term of this patent subsequent to

February 5, 1991, has been disclaimed.

*Signed and Sealed this*

*twenty-ninth* Day of *June 1976*

[SEAL]

*Attest:*

RUTH C. MASON
*Attesting Officer*

C. MARSHALL DANN
*Commissioner of Patents and Trademarks*